United States Patent
Shioiri et al.

(10) Patent No.: US 7,896,636 B2
(45) Date of Patent: Mar. 1, 2011

(54) SUPPORT APPARATUS OF INJECTION-MOLDING MACHINE

(75) Inventors: Takayoshi Shioiri, Sakaki-machi (JP); Yoshitoshi Yamagiwa, Sakaki-machi (JP); Eiki Iwashita, Sakaki-machi (JP)

(73) Assignee: Nissei Plastic Industrial Co., Ltd. (JP)

( * ) Notice: Subject to any disclaimer, the term of this patent is extended or adjusted under 35 U.S.C. 154(b) by 538 days.

(21) Appl. No.: 11/975,281

(22) Filed: Oct. 18, 2007

(65) Prior Publication Data

US 2008/0102147 A1    May 1, 2008

(30) Foreign Application Priority Data

Oct. 27, 2006    (JP)    ............................ P2006-293087

(51) Int. Cl.
  *B29C 45/76* (2006.01)
(52) U.S. Cl. .................. 425/138; 425/139; 425/140; 700/200; 700/201; 700/204
(58) Field of Classification Search .............. 425/138, 425/139, 140; 700/200, 201, 204
See application file for complete search history.

(56) References Cited

U.S. PATENT DOCUMENTS

| | | | | |
|---|---|---|---|---|
| 4,755,122 | A * | 7/1988 | Schmidt | 425/140 |
| 5,186,956 | A * | 2/1993 | Tanino et al. | 425/135 |
| 5,275,768 | A * | 1/1994 | Inaba et al. | 264/40.1 |
| 5,350,547 | A * | 9/1994 | Yamaguchi et al. | 264/40.1 |
| 5,461,570 | A * | 10/1995 | Wang et al. | 700/110 |
| 5,586,041 | A * | 12/1996 | Mangrulkar | 700/174 |
| 5,599,486 | A * | 2/1997 | Fujishiro et al. | 264/40.1 |
| 5,671,335 | A * | 9/1997 | Davis et al. | 706/25 |
| 5,914,884 | A * | 6/1999 | Gur Ali et al. | 700/200 |
| 6,036,466 | A * | 3/2000 | Bayer et al. | 425/144 |
| 6,381,512 | B1* | 4/2002 | Saitou et al. | 700/200 |
| 6,490,501 | B1* | 12/2002 | Saunders | 700/198 |
| 6,527,534 | B1* | 3/2003 | Kamiguchi et al. | 425/139 |
| 6,533,972 | B1* | 3/2003 | Stirn | 264/40.5 |
| 6,600,961 | B2* | 7/2003 | Liang et al. | 700/48 |
| 6,616,872 | B2* | 9/2003 | Kamiguchi et al. | 264/40.1 |
| 6,669,877 | B2* | 12/2003 | Matsubayashi et al. | 264/40.1 |
| 6,696,649 | B2* | 2/2004 | Suzuki et al. | 177/50 |

(Continued)

FOREIGN PATENT DOCUMENTS

JP    2001 088187    4/2001

*Primary Examiner*—Yogendra N Gupta
*Assistant Examiner*—Emmanuel S Luk
(74) *Attorney, Agent, or Firm*—Adams & Wilks

(57) ABSTRACT

A support apparatus of an injection-molding machine has a neural network that receives test molding data corresponding to molding conditions and a quality value obtained by measuring a non-defective molded article, and that determines a quality prediction function based on the received test molding data. A computer calculates a predicted value of the quality value using the quality prediction function. An input apparatus inputs into the neural network fixed values for the molding conditions except for a selected at least one of the molding conditions, and inputs a target value of the quality value. A graph generator generates a graphical relationship between the selected at least one molding condition and the predicted value. A graph correction unit corrects the graphical relationship generated by the graph generator on the basis of the target value. A display unit selectively displays the graphical relationship generated by the graph generator and the graphical relationship corrected by the graph correction unit.

13 Claims, 12 Drawing Sheets

U.S. PATENT DOCUMENTS

| | | | |
|---|---|---|---|
| 6,839,608 B2 * | 1/2005 | Sarabi et al. | 700/201 |
| 6,847,854 B2 * | 1/2005 | Discenzo | 700/99 |
| 6,901,391 B2 * | 5/2005 | Storm et al. | 706/16 |
| 7,117,056 B2 * | 10/2006 | Balic | 700/104 |
| 7,252,796 B2 * | 8/2007 | Nishizawa | 264/40.1 |
| 7,323,125 B2 * | 1/2008 | Uwaji et al. | 264/40.1 |
| 2001/0031288 A1 * | 10/2001 | Onishi | 425/139 |

* cited by examiner

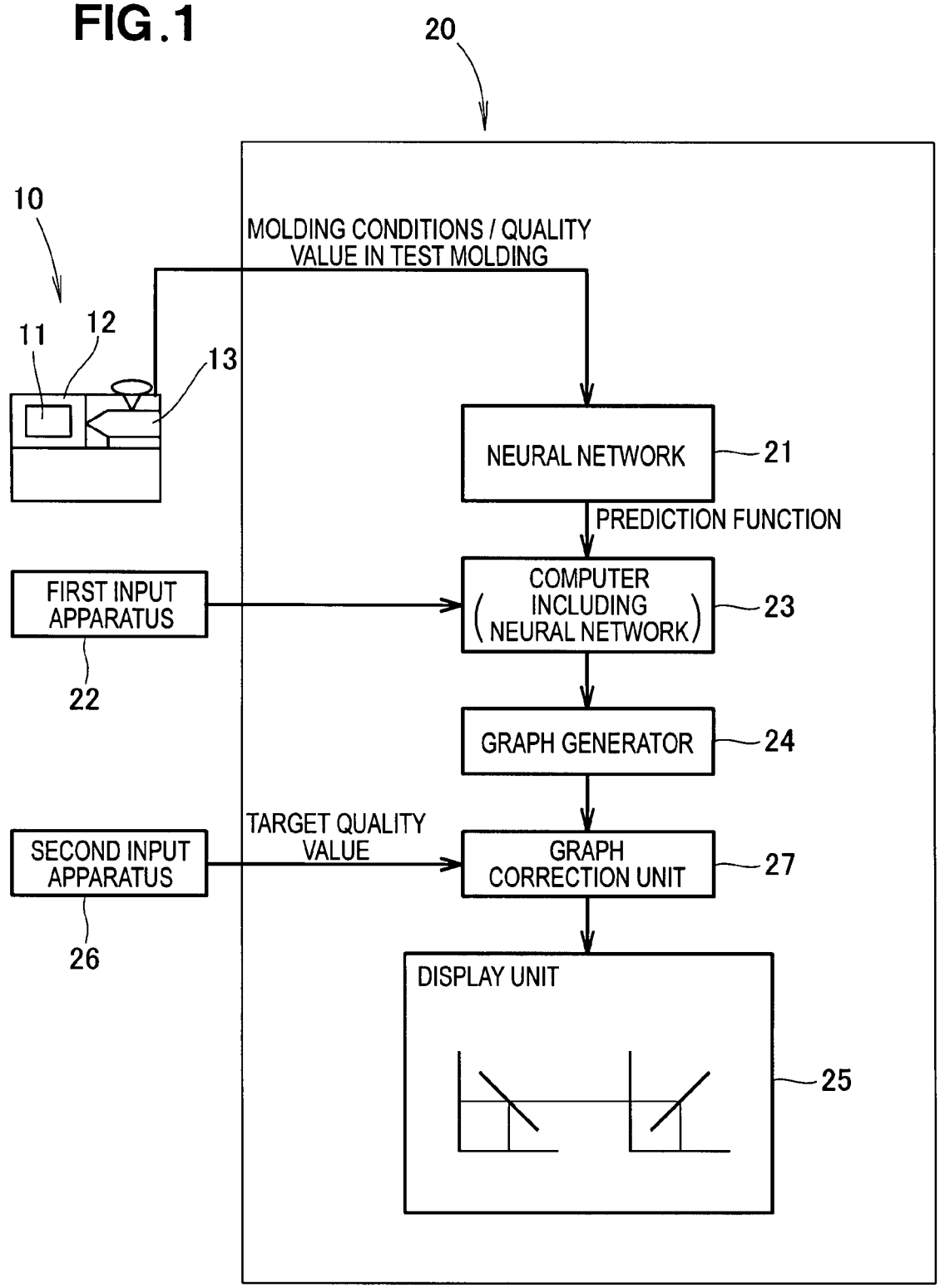

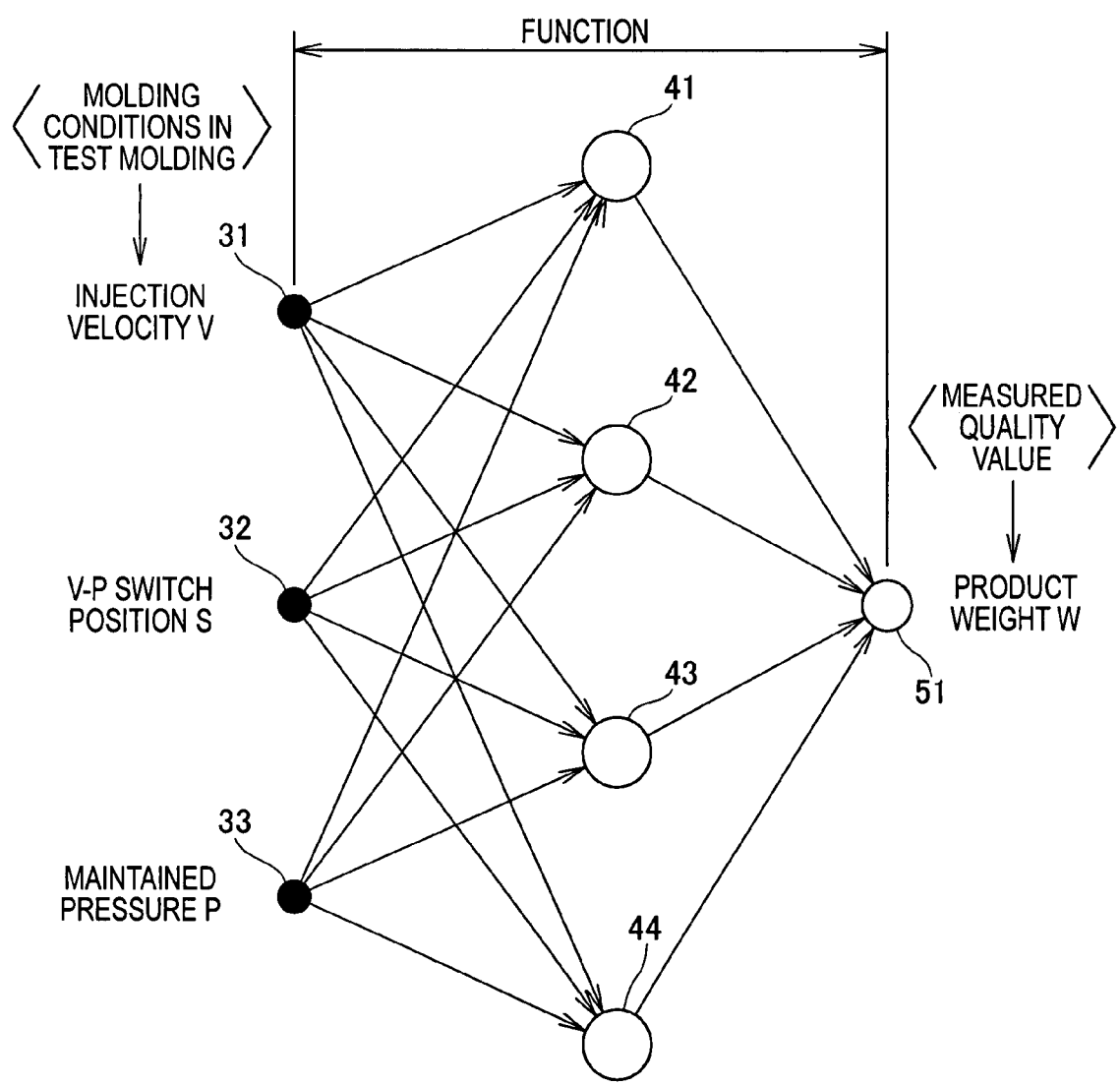

FIG. 3A

```
THE MOLDING CONDITIONS MAY BE SELECTED FROM
            THE FOLLOWINGS
V-P SWITCH POSITION   ☐
MAINTAINED PRESSURE   ☐
INJECTION VELOCITY    ☑
```

FIG. 3B

```
SPECIFY A FIXED VALUE FOR THE VALUE OF THE
        UNSELECTED MOLDING CONDITIONS

V-P SWITCH POSITION   (6.81~7.81)   [7.01]  mm
MAINTAINED PRESSURE  (79.7~81.7)   [79.7]  Mpa
```

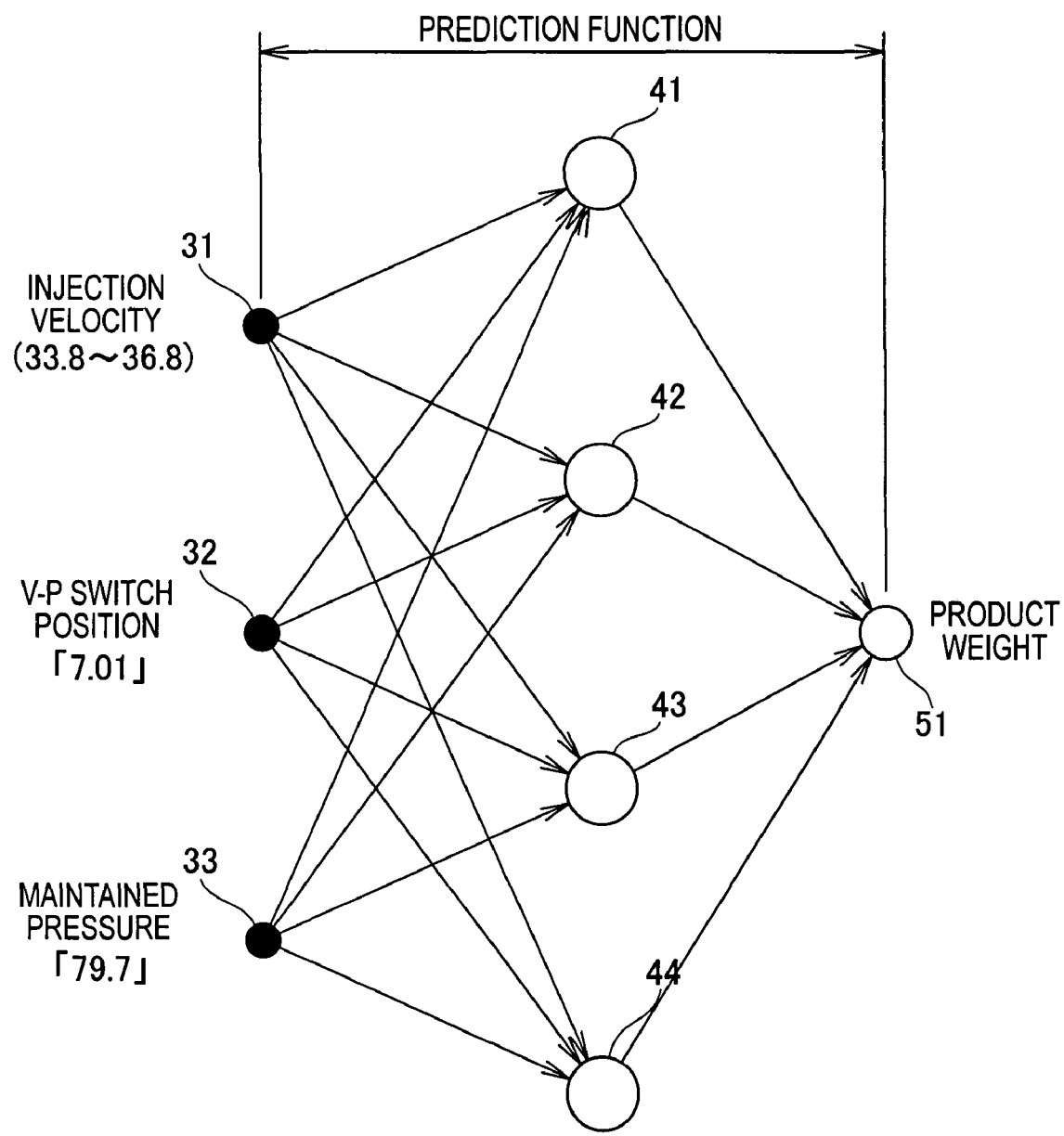

FIG.6A

SPECIFY A QUALITY TARGET VALUE ?

SPECIFY ☑

DO NOT SPECIFY ☐

FIG.6B

SPECIFY A TARGET QUALITY VALUE

PRODUCT WEIGHT (6.6345~6.6742)

THE MOLDING CONDITIONS MAY BE SELECTED FROM THE FOLLOWINGS

V-P SWITCH POSITION ☑

MAINTAINED PRESSURE ☐

INJECTION VELOCITY ☑

FIG.8B

SPECIFY A FIXED VALUE FOR THE VALUE OF THE UNSELECTED MOLDING CONDITIONS

MAINTAINED PRESSURE (78.7~81.7)  | 79.7 | Mpa

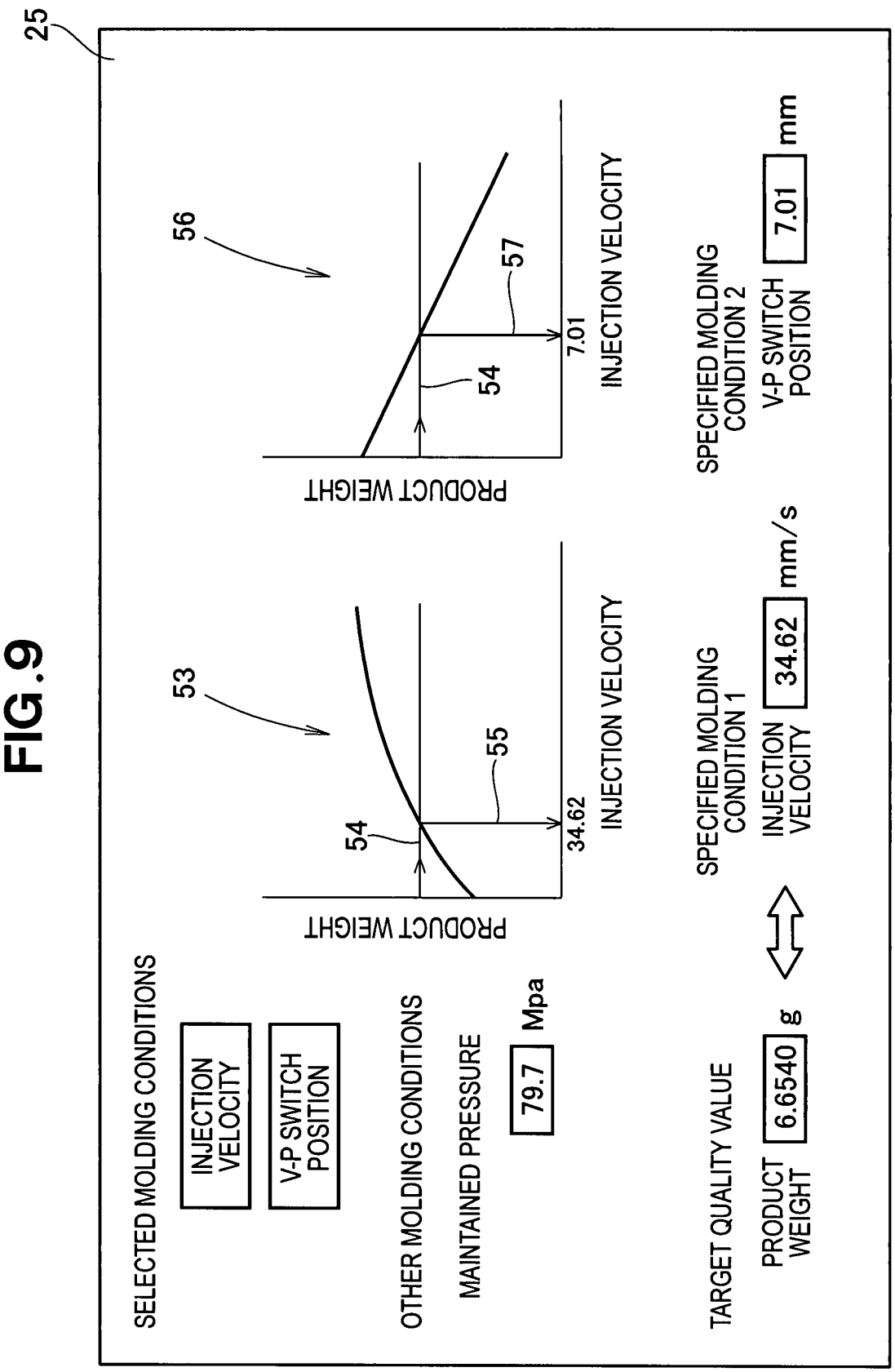

SUPPORT APPARATUS OF INJECTION-MOLDING MACHINE

FIELD OF THE INVENTION

The present invention relates to a support apparatus for supporting a worker involved in operating an injection-molding machine.

BACKGROUND OF THE INVENTION

Injection-molding machines that inject resin material into a metal mold to manufacture a resin article are widely used in practice. In injection-molding machines, mass production molding is started after the molding conditions have been manually entered by a worker. However, the molding conditions differ according to the shape of the molded article and the properties of the resin. For this reason, the molding conditions must be determined before mass production molding can take place, and work must be performed to determine the molding conditions.

The work of determining the molding conditions is preferably carried out by a skilled worker having considerable knowledge and experience. However, if no such skilled worker is available, an unskilled worker must be assigned to do the work of determining the molding conditions.

In this case, it is useful to use a support system referred to as an expert system, as disclosed in, e.g., JP 2001-88187 A. In other words, the molding conditions can be derived even by an unskilled worker when an expert system is used. The system disclosed in JP 2001-88187 A will be described with reference to FIG. 12 hereof.

In the system shown in FIG. 12, information data 102 related to the molded article and the metal mold is entered by the worker to an initial molding condition determination unit 103 with the aid of an input unit 101. Machine data 105 related to the injection-molding machine is entered from a machine database file 104, and resin data 107 related to the resin material is entered from a resin database file 106 into the initial molding condition determination unit 103. The initial molding condition determination unit 103 calculates the molding conditions 108.

A flow analyzer 109 predicts the parameters that are present during and after molding on the basis of the molding conditions 108. When this prediction leads to molding defects, a molding condition correction unit 110 corrects the molding conditions. The worker enters the corrected molding conditions 108 to the flow analyzer 109, and the various parameters that are present during and after molding are predicted again. The worker repeats a series of procedures until the molded article becomes an acceptable product. The final molding conditions are the suitable molding conditions 108.

The worker is not required to actually perform injection molding because the flow analyzer 109 predicts the various parameters that are present during and after molding. This process is advantageous in that more suitable molding conditions can be obtained and wasted time and costs can be eliminated by repeating molding conditions correction and flow analysis without performing test injection molding.

In other words, the worker can know the suitable molding conditions 108 by merely entering molding and metal mold information 102 using the input unit 101.

The suitable molding conditions 108 obtained in this manner still generate molding defects when actual injection molding is carried out using an injection-molding machine. The worker is unable to determine which of a plurality of molding conditions to correct when molding defects are generated. This is because the process for computing the suitable molding conditions 108 is a black box for the worker.

In other words, the system described in FIG. 12 is not advantageous from the standpoint of training and developing an unskilled worker.

In view of the above, a technique for allowing the worker to be aware of the relationship between the molding conditions and the molded article using a viewable graph has been proposed in, e.g., JP 2006-123172 A. The technique proposed in JP 2006-123172 A will be described with reference to FIG. 13 hereof.

A birefringence graph 121, which is a single evaluation item of the molded article (disc substrate), can be displayed on a display unit 120 provided to the injection-molding machine for injecting the disc substrate, as shown in FIG. 13.

The birefringence graph 121 provides a representation of the distance from the center of the molded article to the external periphery shown on the horizontal axis 122 and the birefringence shown on the vertical axis 123, resulting in a curved line 124.

Also provided below the birefringence graph 121 are displays 125 of the molding conditions composed of "Compression Start Position," "Heating Cylinder Temperature," "Injection Velocity," and "Mold Clamping Force," as well as increase buttons 126 and decrease buttons 127 associated with the displays 125.

The worker moves the curved line 124 upward or downward by pressing the increase button 126 or the decrease button 127 associated with the "Compression Start Position," for example. The curved line 124 is alternatively rotated.

Specifically, the worker can be visually made aware of the manner in which the birefringence graph 121 changes when the increase button 126 is pressed, and the worker can be visually made aware of how the birefringence graph 121 changes when the decrease button 127 is pressed. Since the birefringence graph 121 can be visually confirmed, the worker can more readily understand the process. For this reason, it is apparent that the technique shown in FIG. 13 is advantageous for worker training.

It should be noted that the plurality of molding conditions affects each other. For this reason, even if the relationship between a single molding condition and a single evaluation item is understood, such knowledge cannot necessarily be adequately applied to the operation of an actual injection-molding machine. Such knowledge is useful for training purposes, but is not useful for operating an injection-molding machine.

In view of this situation, there is a need for a support apparatus that is advantageous for training an unskilled worker and useful for operating an actual injection-molding machine.

SUMMARY OF THE INVENTION

According to the present invention, there is provided a support apparatus of an injection-molding machine for supporting a worker involved in operating an injection-molding machine, the support apparatus comprising: a neural network that uses as input items a plurality of molding conditions used when a non-defective article is obtained in test molding, uses as an output item a measured quality value obtained by measuring the non-defective article, and determines a prediction function based on the input and output items; a first input apparatus that inputs into the neural network fixed values for molding conditions other than selected molding conditions when at least one molding condition has been selected from the plurality of molding conditions; a computer that acquires a prediction function determined by the neural network, sets the output items of the prediction function to an unknown number, enters fixed values for a portion of the input items of the prediction function, enters the selected molding conditions for the remaining portion of the input items of the prediction function in the form of variables, and thereafter uses the prediction function to calculate predicted quality values corresponding to predicted values of the measured quality value; a graph generator that generates in the form of a graph a relationship between the selected molding conditions and the predicted quality values; and a display unit that selectively displays the graph generated by the graph generator.

Since the correlation between molding conditions selected by the worker and the prediction quality value predicted from the selected molding conditions can be viewed at any time by the worker, the manner in which the quality value changes can be visually observed by varying the molding conditions. The training effect for an unskilled worker is enhanced because the process is based on visual confirmation.

The predicted quality value can be applied with high reliability to mass production molding because the value is calculated using a prediction function determined based on test molding data.

Therefore, in accordance with the present invention, a support apparatus can be provided that is advantageous for training unskilled workers and useful for operating an actual injection-molding machine.

Preferably, the support apparatus further comprises a second input apparatus used by a worker to enter a target quality value, which is a target value of the quality, and a graph correction unit for correcting the graph on the basis of the target quality value entered using the second input apparatus.

The graph is corrected in correspondence to the target quality value entered by the worker. The worker can modify the molding conditions while referencing the changes in the graph.

The worker can view at any time the molding conditions that correspond to the target quality value specified by the worker himself.

It is also preferred that a plurality of graphs be displayed on the display unit when there is a plurality of the selected molding conditions. The plurality of molding conditions affects each other. However, the worker can easily be made aware of the relationship between the molding conditions by displaying a plurality of graphs.

It is also preferred that the quality value be the product weight. The product weight is the most important value among the various quality values, and resin material can be saved by keeping the product weight constant.

BRIEF DESCRIPTION OF THE DRAWINGS

Certain preferred embodiment of the present invention will be described in detail below, by way of example only, with reference to the accompanying drawings, in which:

FIG. 1 is a block diagram illustrating an injection-molding machine in conjunction with its support apparatus according to the present invention;

FIG. 2 is a view showing the basic theory of the neural network included in the support apparatus;

FIGS. 3A and 3B are diagrams showing examples of messages displayed on the display unit included in the support apparatus;

FIG. 4 is a diagram illustrating the effect of a computer included in the support apparatus;

FIGS. 6A and 6B are views showing examples of messages related to graph correction;

FIGS. 8A and 8B are views showing other examples of displayed messages;

FIG. 9 is a view showing yet another example of a corrected graph;

DESCRIPTION OF THE PREFERRED EMBODIMENTS

Figure 5:
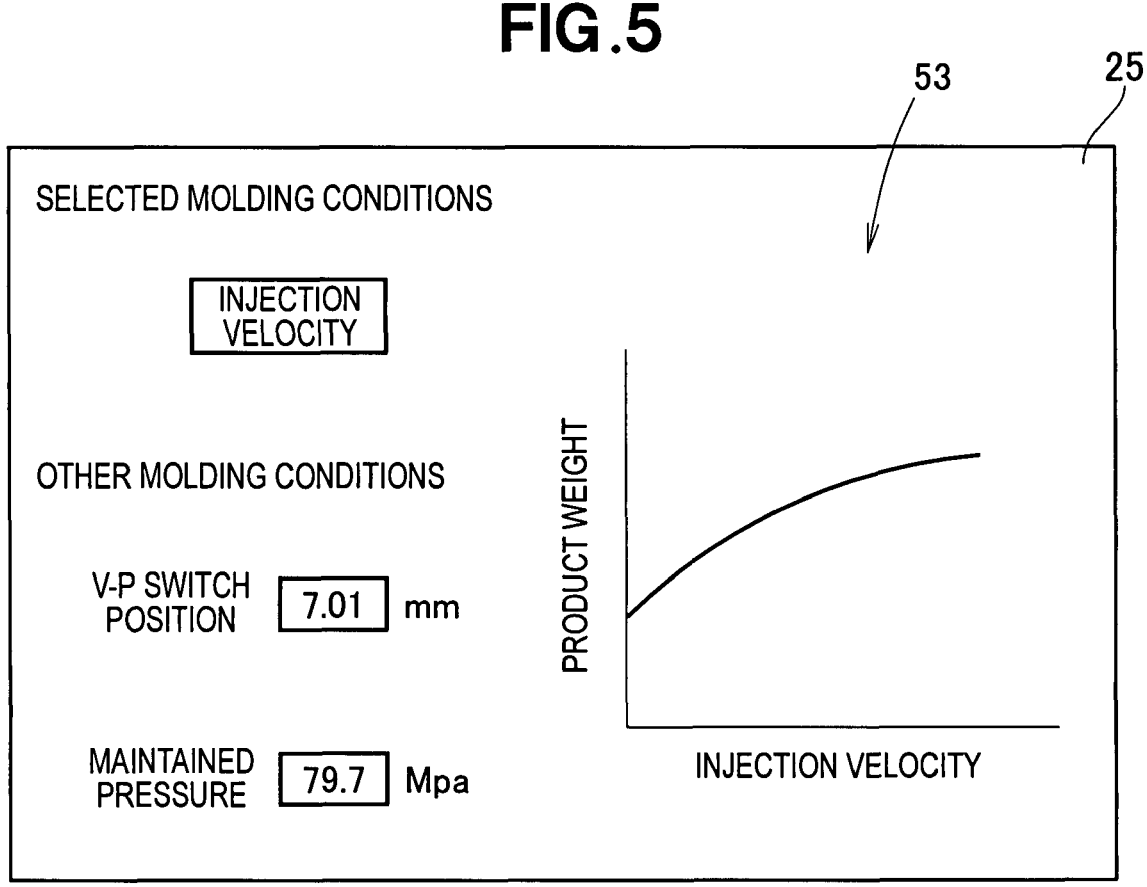
FIG. 5 is a view of a graph displayed on the display unit.

As shown in FIG. 1, an injection-molding machine 10 is mainly composed of a mold clamping apparatus 12 that clamps a metal mold 11, and an injection apparatus 13 that injects resin into the metal mold 11, and further comprises a support apparatus 20.

The support apparatus 20 is an apparatus that supports a worker involved in operating the injection-molding machine 10, and comprises a neural network 21 that uses as an input item a plurality of molding conditions used when a non-defective article is obtained in test molding, uses as an output item a quality value obtained by measuring the non-defective article, and establishes a prediction function based on the input and output items; a first input apparatus 22 provided for work of entering fixed values for molding conditions other than selected molding conditions when at least one molding condition has been selected from the plurality of molding conditions; a computer 23 for acquiring a prediction function determined by the neural network, setting the output items of the prediction function to an unknown number, entering fixed values for a portion of the input items of the prediction function, entering the selected molding conditions for the remaining portion of the input items of the prediction function in the form of variables, and then calculating a predicted quality value, which is a predicted value of the quality value, using such a prediction function; a graph generator 24 for generating in the form of a graph the relationship between the selected molding conditions and the predicted quality values; and a display unit 25 for displaying the graph generated by the graph generator.

The constituent elements are described in detail below.

In the neural network shown in FIG. 2, the input items 31, 32, and 33 for the molding conditions used in test molding are, e.g., injection velocity V defined by the forward velocity of the screw; V-P switch position S defined as the switch position when a switch is made to pressure control based on injection pressure from velocity control in which the mode of the movement control of the screw is based on the injection velocity; and maintained pressure P defined as the pressure maintained when the pressure inside the cavity is kept constant immediately after injection.

The value of the intermediate layer 41 is determined by processing the input items 31, 32, and 33 using weighting coefficients that have been established for each input and threshold value. The value of the intermediate layer 42 is determined by processing the input items 31, 32, and 33 using weighting coefficients that have been established for each input and another threshold value. The intermediate layers 43 and 44 are determined in the same manner.

The output item 51 is determined by processing the values of the intermediate layers 41 to 44 using the weight coefficients that have been established for yet another threshold and each of the intermediate layers 41 to 44. The output item 51 is a measured quality value, e.g., the product weight W.

The neural network is a function, the input items 31 to 33 and the output item 51 can therefore be known quantities, and the threshold values and weighting coefficients in the function can be unknown quantities.

In other words, the molding conditions for the input items 31, 32, and 33, and the product weight measured for the output item 51 are given. A computer repeatedly performs computations while correcting the weighting coefficients and threshold values until the output item 51 matches the measured product weight. The weighting coefficients and threshold values are determined when the output item 51 adequately conforms to the measured product weight.

At this point, the V-P switch position S, the maintained pressure P, and the injection velocity V are selected as three input items.

Five values S1 to S5 are determined for the V-P switch position S. For example, S1 is 6.81 mm, S2 is 7.06 mm, S3 is 7.31 mm, S4 is 7.56, and S5 is 7.81 mm.

Five values P1 to P5 are determined for the maintained pressure P. For example, P1 is 79.7 MPa, P2 is 80.2 MPa, P3 is 80.7 MPa, P4 is 81.2 MPa, and P5 is 81.7 MPa.

Five values V1 to V5 are determined for the injection velocity V. For example, V1 is 33.8 mm/s, V2 is 34.6 mm/s, V3 is 35.3 mm/s, V4 is 36.1 mm/s, and V5 is 36.8 mm/s.

The molding conditions described above are entered into the injection-molding machine, the other molding conditions are kept constant, several test moldings are carried out by combination, and the weight of the resulting molded article (product weight) is measured. The molding conditions in the test molding and the measured product weights are shown in the following table.

TABLE

| | Molding conditions in test molding | | | |
|---|---|---|---|---|
| Experiment No. | V-P switch position mm | Maintained pressure MPa | Injection velocity mm/s | Measured quality value Product weight g |
| 1 | S1 | P1 | V1 | 6.6598 |
| 2 | S2 | P2 | V2 | 6.6546 |
| 3 | S3 | P3 | V3 | 6.6565 |
| 4 | S4 | P4 | V4 | 6.6629 |
| 5 | S5 | P5 | V5 | 6.6627 |
| 6 | S1 | P2 | V3 | 6.6635 |
| 7 | S2 | P3 | V4 | 6.6687 |
| 8 | S3 | P4 | V5 | 6.6671 |
| 9 | S4 | P5 | V1 | 6.6633 |
| 10 | S5 | P1 | V2 | 6.6345 |
| 11 | S1 | P3 | V5 | 6.6695 |
| 12 | S2 | P4 | V1 | 6.6657 |
| 13 | S3 | P5 | V2 | 6.6667 |
| 14 | S4 | P1 | V3 | 6.6541 |
| 15 | S5 | P2 | V4 | 6.6538 |
| 16 | S1 | P4 | V2 | 6.6694 |
| 17 | S2 | P5 | V3 | 6.6663 |
| 18 | S3 | P1 | V4 | 6.6545 |
| 19 | S4 | P2 | V5 | 6.6579 |
| 20 | S5 | P3 | V1 | 6.6439 |
| 21 | S1 | P5 | V4 | 6.6742 |
| 22 | S2 | P1 | V5 | 6.6601 |
| 23 | S3 | P2 | V1 | 6.6432 |
| 24 | S4 | P3 | V2 | 6.6494 |
| 25 | S5 | P4 | V3 | 6.6576 |

The number of test molding experiments is 3 elements×5 types and 125 (5×5×5=125) possibilities, but the possibilities were limited to 25 (25 experiments) as shown in the table above.

The V-P switch position S1, maintained pressure P1, and injection velocity V1 noted in experiment no. 1 are entered for the input items 31 through 33 in FIG. 2, the product weight of 6.6598 g is entered for the output item 51, and the function of the neural network is calculated. Next, the V-P switch position S2, maintained pressure P2, and injection velocity V2 noted in experiment no. 2 are entered for the input items 31 through 33 in FIG. 2, the product weight of 6.6546 g is entered for the output item 51, and the function of the neural network is calculated. The above-described procedure is also used for experiment nos. 3 through 25. In other words, the certainty of the functions can be increased by repeating the calculations 25 times.

The prediction function (neural network function) is determined by the above procedure. The prediction function thus determined is stored in the computer 23 in FIG. 1.

The effect of the first input apparatus 22 shown in FIG. 1 will be described in the next diagram. The first input apparatus 22 is a touch panel, a mouse and/or keyboard, or the like. Specifically, the worker enters numerical values and commands using the first input apparatus 22 when a message is displayed on the display unit 25.

A message is displayed on the display unit 25 as shown in FIG. 3A. The plurality of molding conditions is the V-P switch position, maintained pressure, and injection velocity, and these conditions are therefore displayed. The value boxes are aligned, and the injection velocity is selected via the first input apparatus.

At this time, the display contents of the display unit 25 are changed to the display contents shown in FIG. 3B. Specifically, the unselected molding conditions are displayed. The parenthesized numbers and oblong boxes are aligned. The parenthesized numbers are displayed in a numerical range used in TABLE 1, specifically, a range of numbers used for learning. The worker enters the value, e.g., "7.01" in the V-P switch position item and the value "79.7" in the maintained pressure item while referencing the parenthesized numbers.

The unselected molding conditions can be fixed using the procedure described above.

The prediction function (neural network function), a V-P switch position of "7.01," and a maintained pressure of "79.7" are given to the computer 23 in FIG. 1.

Next, the operation of the computer 23 will be described. In the computer, "7.01" is given as a fixed value to the input item 32, and a "79.7" is given as a fixed value to the input item 33, as shown in FIG. 4. The injection velocity is then given as a variable to the input item 31. Specifically, the learning range of values of the injection velocity, i.e., 33.8 through 36.8, is finely divided and given as 33.80, 33.81, 33.82, . . . , 36.79, and 36.90. A single product weight per single variable is calculated for the output item 51 using the prediction function (neural network function).

A graph in which the injection velocity is represented on the horizontal axis (x axis) and the product weight is represented on the vertical axis (y axis) is generated in the graph generator 24 in FIG. 1. The generated graph is displayed on the display unit 25. A display example of the display unit 25 will be described in the next diagram.

The graph 53 generated in the graph generator 24 is displayed on the display unit 25, as shown in FIG. 5. Also displayed on the display unit 25 are the selected molding conditions, the fixed value of the V-P switch position, and the fixed value of the maintained pressure.

The effect of the second input apparatus 26 of FIG. 1 will be described next. The second input apparatus 26 is also a touch panel, a mouse and/or keyboard, or the like. Specifically, the worker enters numerical values and commands using the second input apparatus 26 when a message is displayed on the display unit 25. The second input apparatus 26 may double as the first input apparatus 22. In this case, the input apparatuses have been separately provided for convenience of description.

A message inquiring whether a target quality value will be specified is displayed on the display unit 25 as shown in FIG. 6A. The process returns to FIG. 5 when "Do not specify" is selected. In this case, the worker has selected "Specify." At this time, the characters of the product weight, (range of numerical values), and an oblong value box is displayed, as shown in FIG. 6B. The numerical range (6.6345 through 6.6742) conforms to the range noted in the rightmost column of TABLE 1. The worker enters the value, e.g., "6.6540" while referencing the parenthesized numbers.

At this point, the graph correction unit 27 of FIG. 1 corrects the graph as shown in the next diagram.

Figure 7:
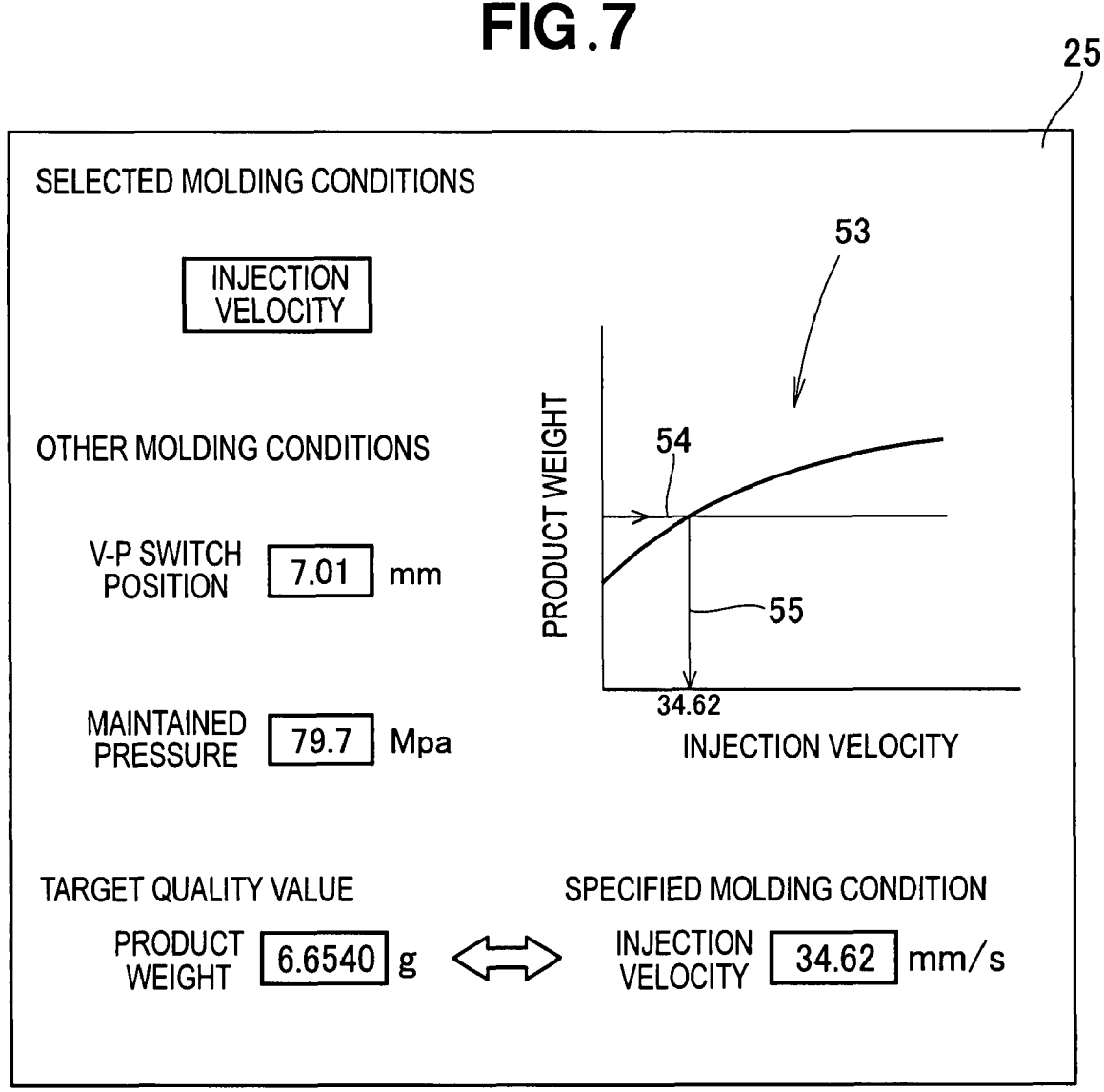
FIG. 7 is a view of a corrected graph.

A horizontal line 54 that corresponds to the specified value 6.6540 is added to the graph 53, as shown in FIG. 7, and a vertical line 55 is added downward from the point at which the horizontal line 54 intersects the curved line. The vertical line 55 intersects the x axis at the scale position 34.62.

Also displayed in the lower portion of the display unit 25 are a product weight of 6.6540 g as the target quality value, and an injection velocity of 34.62 mm/s as the specific molding condition.

In other words, if the desired product weight is 6.6540 g, an injection velocity of 34.62 mm/s is recommended, and the worker can set the injection velocity on the basis of this message and carry out injection molding.

A detailed description is omitted, but in FIG. 7, the worker can manually change the numerical values "7.01," "79.7," and/or "6.6540." The graph 53 and the numerical value of the injection velocity are modified in accordance with the manual modifications of the worker.

Therefore, the worker can readily discern the manner in which the numerical value of the injection velocity as a specific molding condition changes when any numerical value is changed by any amount.

In addition, the numerical values can be adequately reflected in mass production molding because molding is based on the actual results of test molding, as shown in TABLE 1 and FIG. 2.

A modified technique of the present invention will be described next.

A new message is displayed on the display unit 25, as shown in FIG. 8A. The plurality of molding conditions is the V-P switch position, the maintained pressure, and the injection velocity, and these conditions are therefore displayed. The value boxes are aligned and the V-P switch position and injection velocity are selected via the first input apparatus.

At this time, the display contents of the display unit 25 are changed to the display contents shown in FIG. 8B. Specifically, the unselected molding conditions are displayed. The parenthesized numbers and oblong boxes are aligned. The parenthesized numbers are displayed as a learning range of the numerical values used in TABLE 1. The worker enters the value, e.g., "79.7" in the maintained pressure item while referencing the parenthesized numbers.

At this point, the graphs 53 and 56 are displayed on the display unit 25, as shown in FIG. 9. Also displayed on the display unit 25 are the selected molding conditions (injection velocity and V-P switch position) and the value 79.7, which is the fixed value of the maintained pressure.

Furthermore, a horizontal line 54 corresponding to the specified value 6.6540 is added to the graphs 53 and 56, and a vertical line 55 and vertical line 57 are added downward from the point at which the horizontal line 54 intersects the curved line. The vertical line 55 intersects the x axis at the scale position 34.62, and the vertical line 57 intersects the x axis at the scale position 7.01.

Also displayed in the lower portion of the display unit 25 are a product weight of 6.6540 g as the target quality value, and an injection velocity of 34.62 mm/s and a V-P switch position of 7.01 mm as the specific molding conditions.

If the desired product weight is 6.6540 g, an injection velocity of 34.62 mm/s and a V-P switch position of 7.01 mm are recommended, and the worker can set the molding conditions on the basis of this message and carry out injection molding.

A detailed description is omitted, but in FIG. 7, the worker can manually change the numerical values "79.7" and/or "6.6540." The graphs 53 and 56 are modified in accordance with the manual modifications of the worker, and the numerical value of the injection velocity and the V-P switch position are modified thereby.

Therefore, the worker can discern the manner in which the numerical value of the injection velocity and the numerical value of the V-P switch position as specific molding conditions change when any numerical value is changed by any amount.

Described next is the ability to input numerical values that are outside of the range of molding conditions.

Figure 10:
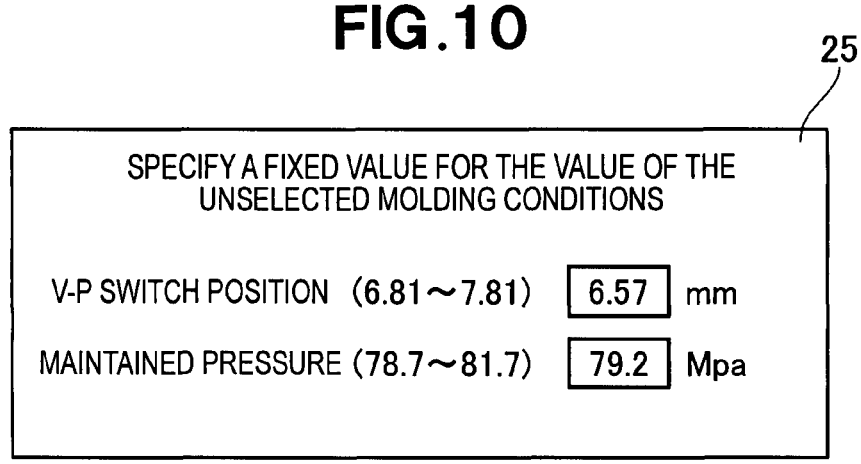
FIG. 10 is a view showing yet another example of a display message.

The parenthesized numerical values of the V-P switch position are 6.81 to 7.81, but a value, e.g., "6.57," that is less than this range can be entered, as shown in FIG. 10. In the same manner, the parenthesized numerical values of the maintained pressure are 79.7 to 81.7, but a value, e.g., "79.2," that is less than this range can be entered.

Figure 11:
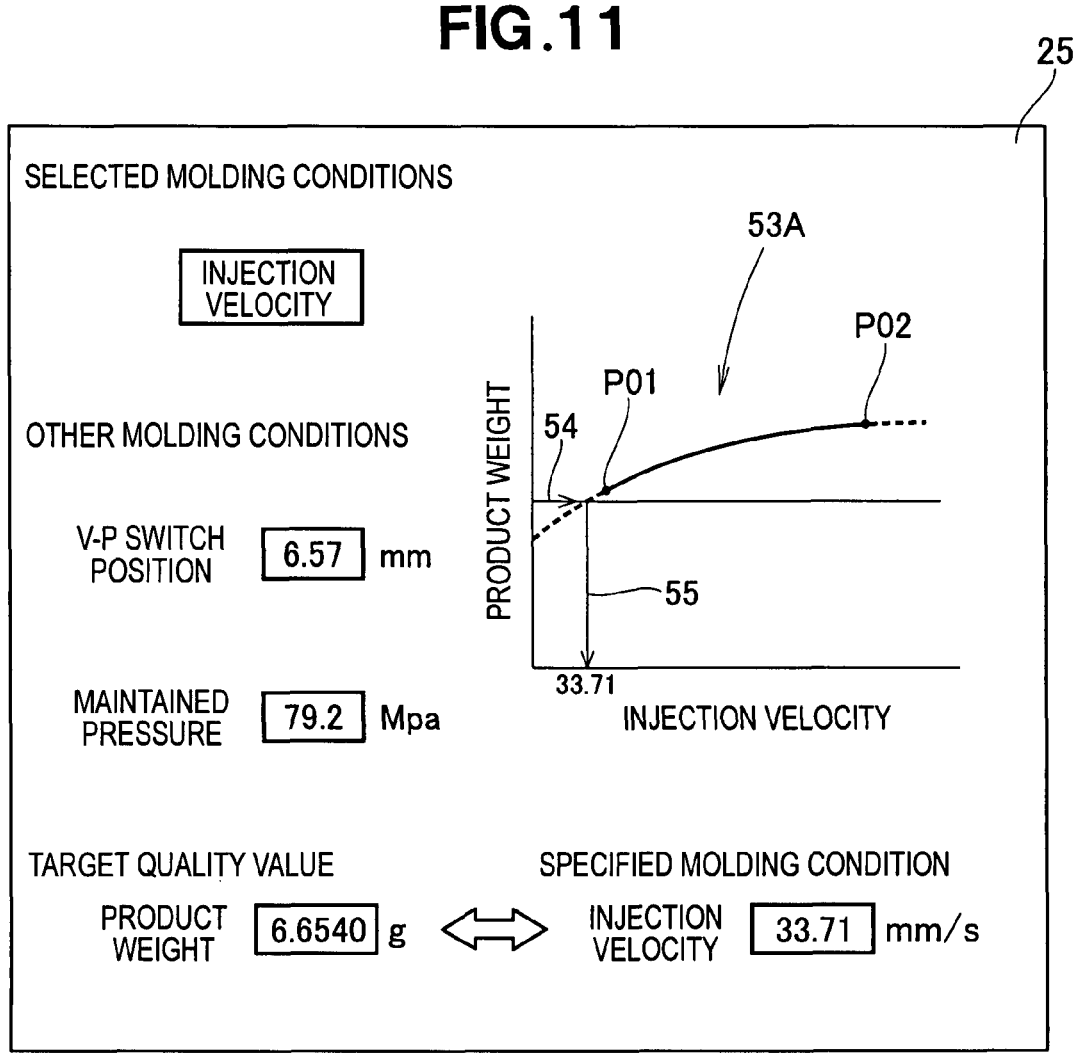
FIG. 11 is a view showing yet another example of a corrected graph.
Figure 12:
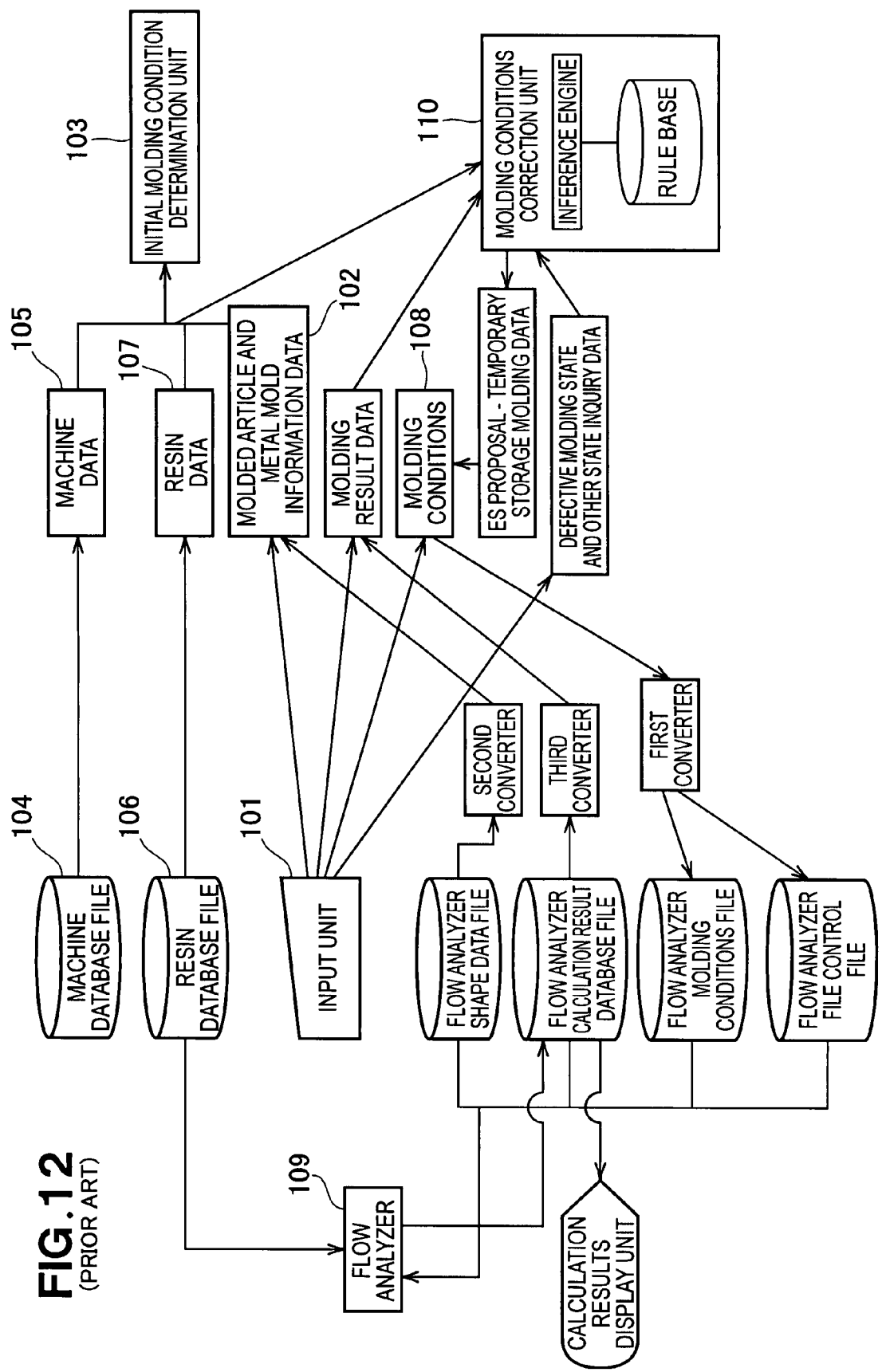
FIG. 12 is a view illustrating a basic principle of a conventional support system.
Figure 13:
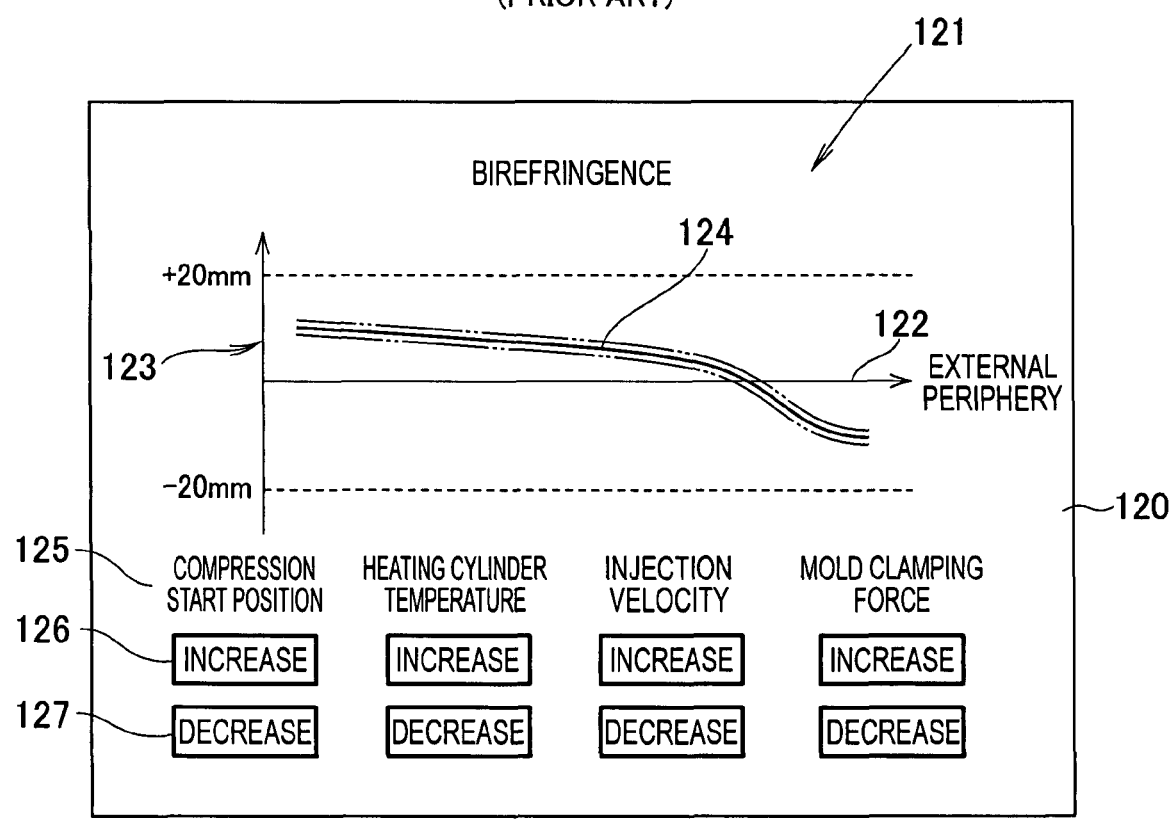
FIG. 13 is a view illustrating the basic principle of a support system using a conventional graph.

As a result of the above-described inputs, the curved line of graph 53A is moved upward overall, as shown in FIG. 11. In the graph 53A, the range between points P01 and P02 is the range used for learning (range of the injection velocity of TABLE 1).

The graph generator 24 of FIG. 1 extends the curved line of graph 53A by extrapolation on the basis of the demands in FIG. 10. Specifically, in graph 53A of FIG. 11, the broken curved line to the left of the point P01 is extended and the broken curved line to the right of the point P02 is extended.

Extrapolation extends the trend of the curved line between the points P01 and P02 on the basis of the assumption that application can also be made beyond the points P01 and P02. Since this is an assumption, the reliability of the portions extended outward by extrapolation is reduced. For this reason, the extrapolated portion is drawn using a "broken line."

The horizontal line 54 and vertical line 55 are drawn based on the product weight 6.6540 as the target quality value. The vertical line intersects the scale on the x axis at 33.71. This value 33.71 is displayed in the lower right portion of the screen.

In this manner, a graph can be drawn and specific molding conditions can be calculated even when a numerical value is entered beyond the range.

In addition to injection velocity, V-P switch position, and maintained pressure as the molding conditions, other items include injection time, cooling time, and other items related to the molding cycle, as well as screw rotational speed, back-pressure, heating cylinder temperature, and other plasticizing conditions. Also, the quality value, in addition to product weight, may be dimensions, warping, birefringence, or another measurable value.

Obviously, various minor changes and modifications of the present invention are possible in light of the above teaching. It is therefore to be understood that within the scope of the appended claims the invention may be practiced otherwise than as specifically described.

What is claimed is:

1. A support apparatus of an injection-molding machine for supporting a worker involved in operating an injection-molding machine, the apparatus comprising:

a neural network that uses as an input item a plurality of molding conditions used when a non-defective article is obtained in test molding, uses as an output item a measured quality value obtained by measuring the non-defective article, and determines a prediction function based on the input and output items;

a first input apparatus that inputs into the neural network fixed values for molding conditions other than selected molding conditions when at least one molding condition has been selected from the plurality of molding conditions;

a computer that acquires a prediction function determined by the neural network, sets the output items of the prediction function to an unknown number, enters fixed values for a portion of the input items of the prediction function, enters the selected molding conditions for the remaining portion of the input items of the prediction function in the form of variables, and thereafter uses the prediction function to calculate predicted quality values corresponding to predicted values of the measured quality value;

a graph generator that generates in the form of a graph a relationship between the selected molding conditions and the predicted quality values;

a second input apparatus that inputs a target quality value corresponding to a target value of the measured quality value;

a graph correction unit into which the second input apparatus inputs the target quality value and that corrects the graph generated by the graph generator on the basis of the target quality value; and a display unit that selectively displays the graph generated by the graph generator and the graph corrected by the graph correction unit.

2. The support apparatus according to claim 1, wherein the graph generator generates a graph for each of the selected molding conditions; and wherein the display unit simultaneously displays the graphs for the selected molding conditions generated by the graph generator.

3. The support apparatus according to claim 1, wherein the measured quality value is the weight of a molded article.

4. An apparatus of an injection-molding machine, comprising:

a neural network that received test molding data corresponding to a plurality of molding conditions used to obtain a non-defective molded article and corresponding to a quality value obtained by measuring the non-defective molded article, and that determines a quality prediction function based on the received test molding data;

a computer that receives the quality prediction function determined by the neural network and calculates a predicted value of the quality value using the quality prediction function;

an input apparatus that inputs into the neural network fixed values for the molding conditions except for a selected at least one of the molding conditions, and that inputs a target value of the quality value;

a graph generator that generated a graphical relationship between the selected at least one molding condition and the predicted value;

a graph correction unit into which the input apparatus inputs the target value and that corrects the graphical relationship generated by the graph generator on the basis of the target value; and a display unit for selectively displaying the graphical relationship generated by the graph generator and the graphical relationship corrected by the graph correction unit.

5. An apparatus according to claim 4; wherein the selected at least one of the molding condition comprises at least two of the molding conditions; and wherein the graph generator generates a graph for each of the at least two molding conditions and the display unit simultaneously displays the graphs for the at least molding conditions.

6. An apparatus according to claim 5; wherein the quality value is the weight of a molded article.

7. An apparatus according to claim 4; wherein the quality value is the weight of a molded article.

8. An apparatus according to claim 4; wherein the input apparatus comprises a first input apparatus that inputs into the neural network fixed values for the molding conditions except for the selected at least one of the molding conditions, and a second input apparatus that inputs the target value into the graph correction unit.

9. An apparatus of an injection-molding machine, comprising:

network means for receiving test molding data corresponding to a plurality of molding conditions used to obtain a non-defective molded article and corresponding to a quality value obtained by measuring the non-defective molded article, and for determining a quality prediction function based on the received test molding data;

computing means for receiving the quality prediction function determined by the network means and for calculating a predicted value of the quality value using the quality prediction function;

input means for inputting into the network means fixed values for the molding condition except for a selected at least one of the molding conditions, and for inputting a target value of the quality value;

graph generating means for generating a graphical relationship between the selected at least one molding condition and the predicted value;

graph correcting means into which the input means inputs the target value for correcting the graphical relationship generated by the graph generator on the basis of the target value; and display means for selectively displaying the graphical relationship generated by the graph generating means and the graphical relationship corrected by the graph correcting means.

10. An apparatus according to claim 9, wherein the selected at least one of the molding conditions comprises at least two of the molding condition; and wherein the graph generating means generates a graph for each of the at least two molding conditions and the display means simultaneously displays the graphs for the at least two molding conditions.

11. An apparatus according to claim 10; wherein the quality value is the weight of a molded article.

12. An apparatus according to claim 9; wherein the quality value is the weight of a molded article.

13. An apparatus according to claim 9; wherein the input means comprises a first input apparatus that inputs into the network means fixed values for the molding conditions except for the selected at least one of the molding conditions, and a second input apparatus that inputs the target value into the graph correcting means.

* * * * *